(12) United States Patent
Narayanan et al.

(10) Patent No.: US 12,674,709 B1
(45) Date of Patent: Jul. 7, 2026

(54) TRANSCEIVER TEMPERATURE ALERT SYSTEM

(71) Applicant: Dell Products L.P., Round Rock, TX (US)

(72) Inventors: Padmanabhan Narayanan, Chennai (IN); Shree Rathinasamy, Georgetown, TX (US); Yayun Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/013,072

(22) Filed: Jan. 8, 2025

(51) Int. Cl.
　　*G01K 1/024* 　　(2021.01)
　　*H04B 1/04* 　　(2006.01)
(52) U.S. Cl.
　　CPC ............... *G01K 1/024* (2013.01); *H04B 1/04* (2013.01)
(58) Field of Classification Search
　　CPC ............ G01K 1/00; G01K 1/02; G01K 1/024; G01K 1/028; H04B 1/02; H04B 1/03; H04B 1/04; H04Q 9/00; H04Q 2209/00; H04Q 2209/75; H04Q 2209/80; H04Q 2209/84; H04Q 2209/86
　　See application file for complete search history.

(56) References Cited

U.S. PATENT DOCUMENTS

| | | | | |
|---|---|---|---|---|
| 9,247,399 B2 * | 1/2016 | Cavallaro | .............. | H04M 19/04 |
| 11,373,490 B2 * | 6/2022 | Gupta | ....................... | G08B 5/36 |
| 11,953,378 B2 * | 4/2024 | Seike | ........................ | G01K 3/08 |
| 12,429,382 B2 * | 9/2025 | Orlandini | ................. | G01K 7/16 |
| 2025/0261820 A1 * | 8/2025 | Jo | ............................ | A47L 15/22 |

FOREIGN PATENT DOCUMENTS

CN 　　208297006 U 　* 12/2018 　............. G01K 11/12

* cited by examiner

*Primary Examiner* — Franklin D Balseca
(74) *Attorney, Agent, or Firm* — Joseph Mencher

(57) ABSTRACT

A transceiver device includes a transceiver device chassis. A computing device connector is included on the transceiver device chassis and is configured to connect to a computing device. A visual temperature indicator subsystem is included on the transceiver device chassis. A visual temperature indicator activation subsystem is housed in the transceiver device chassis, and is coupled to the computing device connector and the visual temperature indicator subsystem. The visual temperature indicator activation subsystem may receive a visual temperature indicator activation command from the computing device and, in response, activate the visual temperature indicator subsystem included on the transceiver device to produce a visual indication of a temperature of the transceiver device.

20 Claims, 16 Drawing Sheets

TRANSCEIVER TEMPERATURE ALERT SYSTEM

BACKGROUND

The present disclosure relates generally to information handling systems, and more particularly to providing alerts about the temperature of transceiver devices used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices (e.g., switch devices, router devices, etc.), storage systems, and/or other computing devices known in the art sometimes utilize transceiver devices to transmit data with other computing devices via a network. For example, relatively high-power optical transceiver devices (e.g., 1G to 800G optical transceiver devices) may be coupled to switch devices in order to convert between electrical communications and optical communications used in electrical/fiber optic networked systems. Such relatively high-power transceiver devices are currently deployed with 800G ports on switch devices, and the deployment of relatively higher-power transceiver devices (e.g., with 1.6 Terabyte (T) ports on switch devices) is anticipated in the coming years. As will be appreciated by one of skill in the art in possession of the present disclosure, transceiver devices generate heat during their operation that raises the temperature of those transceiver devices, which can cause issues if users come into contact with them.

While fan-based cooling systems in switch devices may dissipate some of the heat generated by transceiver devices, fan-based cooling is not capable of dissipating the amount of heat that may be generated by the relatively high-power transceiver devices discussed above. As such, current industry practices require the user to log in to the switch device with which the transceiver devices are operating in order to identify the temperature of those transceiver devices so that a user may ensure that they do not come into contact with transceiver devices having a temperature above a temperature threshold. However, the need to log into the switch device to determine the temperature of its transceiver devices is cumbersome and time-consuming. Furthermore, in some situations the user may not have log-in access to the switch device, and thus will not be able to monitor the temperature of the transceiver devices operating in that switch device. Further still, a user accessing switch devices, server devices, networking devices, and/or other computing devices in a rack system may unintentionally come in contact with transceiver devices in an adjacent rack system that are above the temperature threshold.

Accordingly, it would be desirable to provide a transceiver temperature alert system that addresses the issues discussed above.

SUMMARY

According to one embodiment, a transceiver temperature alert subsystem includes a transceiver device; a visual temperature indicator subsystem that is included on the transceiver device; and a computing device that includes a port that is connected to the transceiver device, wherein the computing device is configured to: retrieve a temperature of the transceiver device; generate, based on the temperature of the transceiver device, a visual temperature indicator activation command; and transmit the visual temperature indicator activation command to the transceiver device to cause the visual temperature indicator subsystem to produce a visual indication of a temperature of the transceiver device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
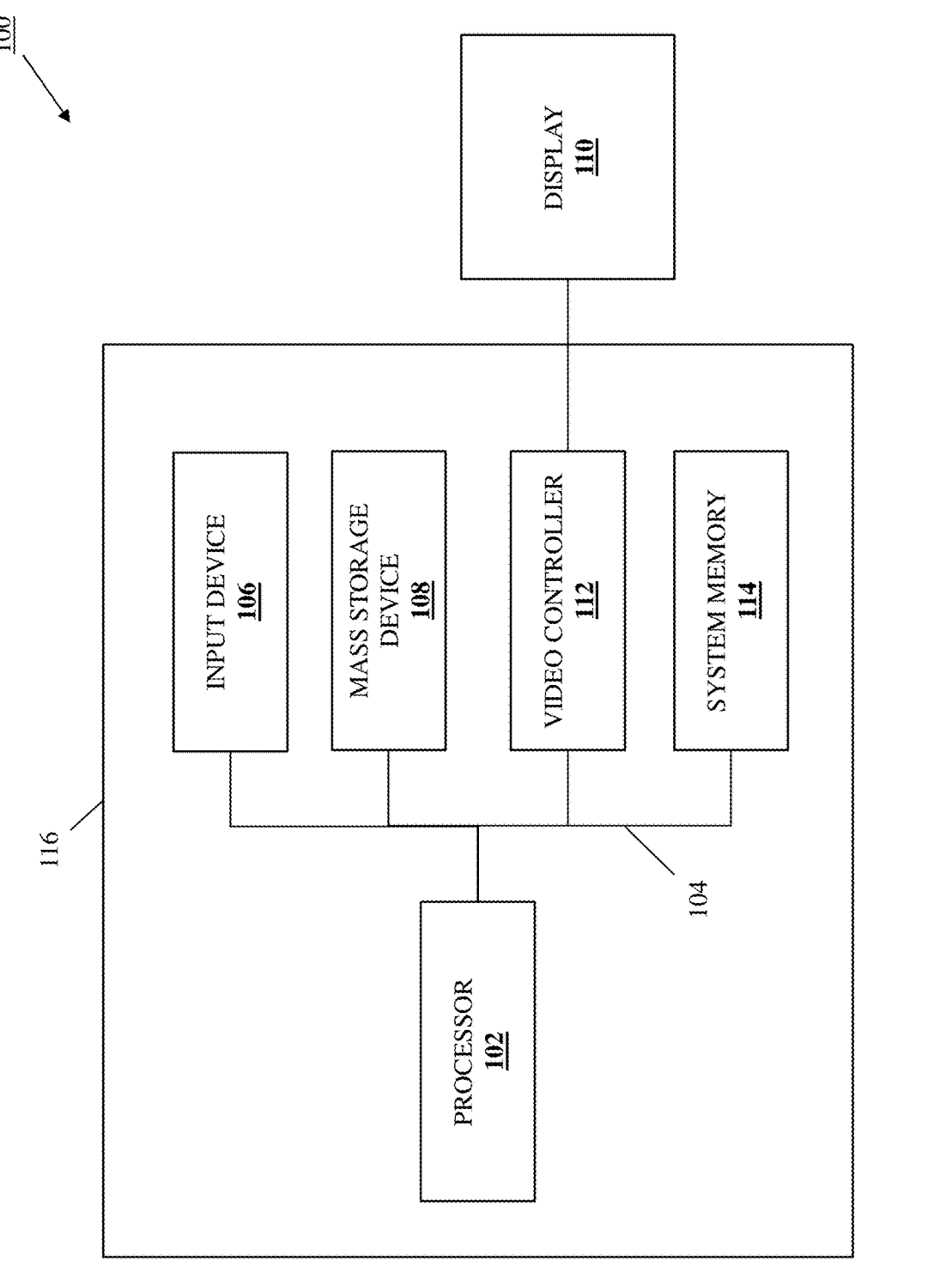
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
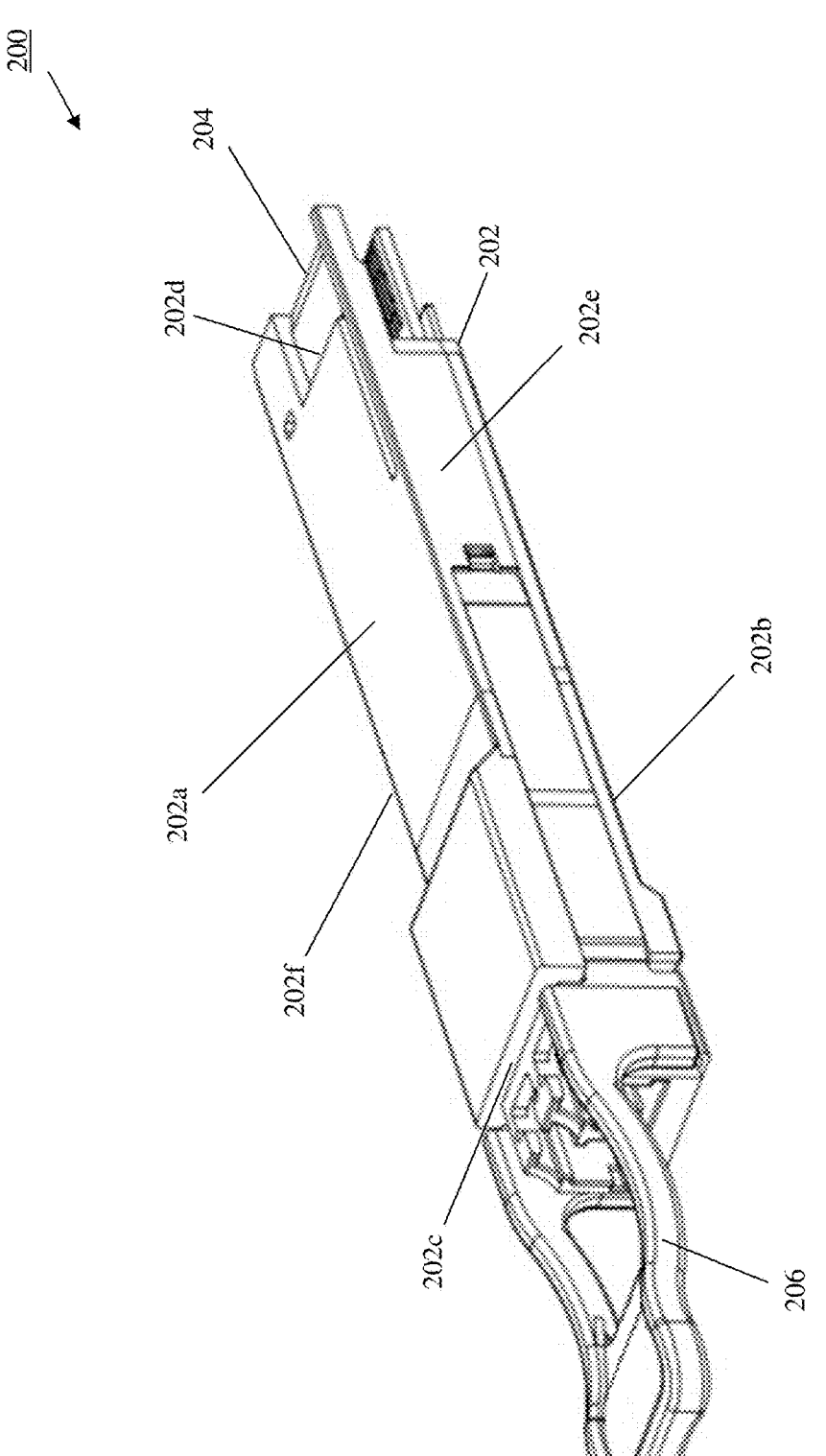
FIG. 2 is a perspective view illustrating an embodiment of a transceiver device that may be included in the transceiver temperature alert system of the present disclosure.

Referring now to FIG. 2, an embodiment of a transceiver device 200 is illustrated that may be included in the transceiver temperature alert system of the present disclosure. In an embodiment, the transceiver device 200 may be utilized with the IHS 100 discussed above with reference to FIG. 1, and thus may provide one of the components of the IHS 100, and in specific examples may be provided by an Quad Small Form-factor Pluggable Double-Density (QSFP-DD) optical transceiver device, although other types of transceiver devices will fall within the scope of the present disclosure as well. In the illustrated embodiment, the transceiver device 200 includes a transceiver chassis 202 having a top surface 202a, a bottom surface 202b that is located opposite the transceiver chassis 202 from the top surface 202a, a front surface 202c that extends between the top surface 202a and the bottom surface 202b, a rear surface 202d that is located opposite the transceiver chassis 202 from the front surface 202c and that extends between the top surface 202a and the bottom surface 202b, and a pair of opposing side surfaces 202e and 202f that are located opposite the transceiver chassis 202 from each other and that extend between the top surface 202a, the bottom surface 202b, the front surface 202c and the rear surface 202d.

In the illustrated embodiment, a computing device connector 204 extends from the rear surface 202d of the transceiver chassis 202 and, in the examples provided below, is configured to engage a transceiver port (e.g., a QSFP-DD transceiver port) included on the networking devices or other computing devices discussed below. A transceiver device handle 206 (e.g., a "push/pull" transceiver handle in the illustrated example) extends from front surface 202c of the transceiver chassis 202 and is configured to be grasped by a user to connect and disconnect the transceiver device 200 from the networking devices and/or other computing devices discussed below.

As described herein, the transceiver chassis 202 may include a visual temperature indicator subsystem that is configured to indicate a temperature of the transceiver device 200. In the specific examples provided below, the visual temperature indicator subsystem includes the transceiver device handle 206. As described in further detail below, the transceiver device handle 206 may be provided by light guides and/or clear/translucent materials that are configured to provide illumination using light emitted from a Light Emitting Diode (LED) system and, in some embodiments, the transceiver device handle 206 may be provided by materials that are configured to diffuse that light (i.e., spread that light across the outer surface of the transceiver device handle 206 in a substantially uniform manner) to cause the outer surface of the transceiver device handle 206 to illuminate as described in further detail below. As will be appreciated by one of skill in the art in possession of the present disclosure, the transceiver device handle includes a unique and relatively large area for illumination that may provide benefits over other types of visual temperature indicators such as for example, Light Emitting Devices (LEDs) that could be mistaken for port status LEDs and may be less easily discerned (e.g., due to their relatively smaller size, due to their relatively close "packing", and due to visual obstructions).

However, while a specific example of the visual temperature indicator subsystem of the present disclosure is illustrated and described below as including the transceiver handle 206, one of skill in the art in possession of the present disclosure will appreciate how the transceiver chassis 202 may include a variety of visual temperature indicator subsystems (e.g., LEDs like those discussed above, displays, etc.) that are configured to indicate a temperature of the transceiver device 200 and that may be provided in any location on the transceiver device chassis 202 while remaining within the scope of the present disclosure as well. Furthermore, while a specific transceiver device 200 has been illustrated and described, one of skill in the art in possession of the present disclosure will appreciate that transceiver devices may include a variety of components and/or component configurations for providing conventional transceiver functionality, as well as the transceiver temperature alert functionality described below, while remaining within the scope of the present disclosure as well.

Figure 3:
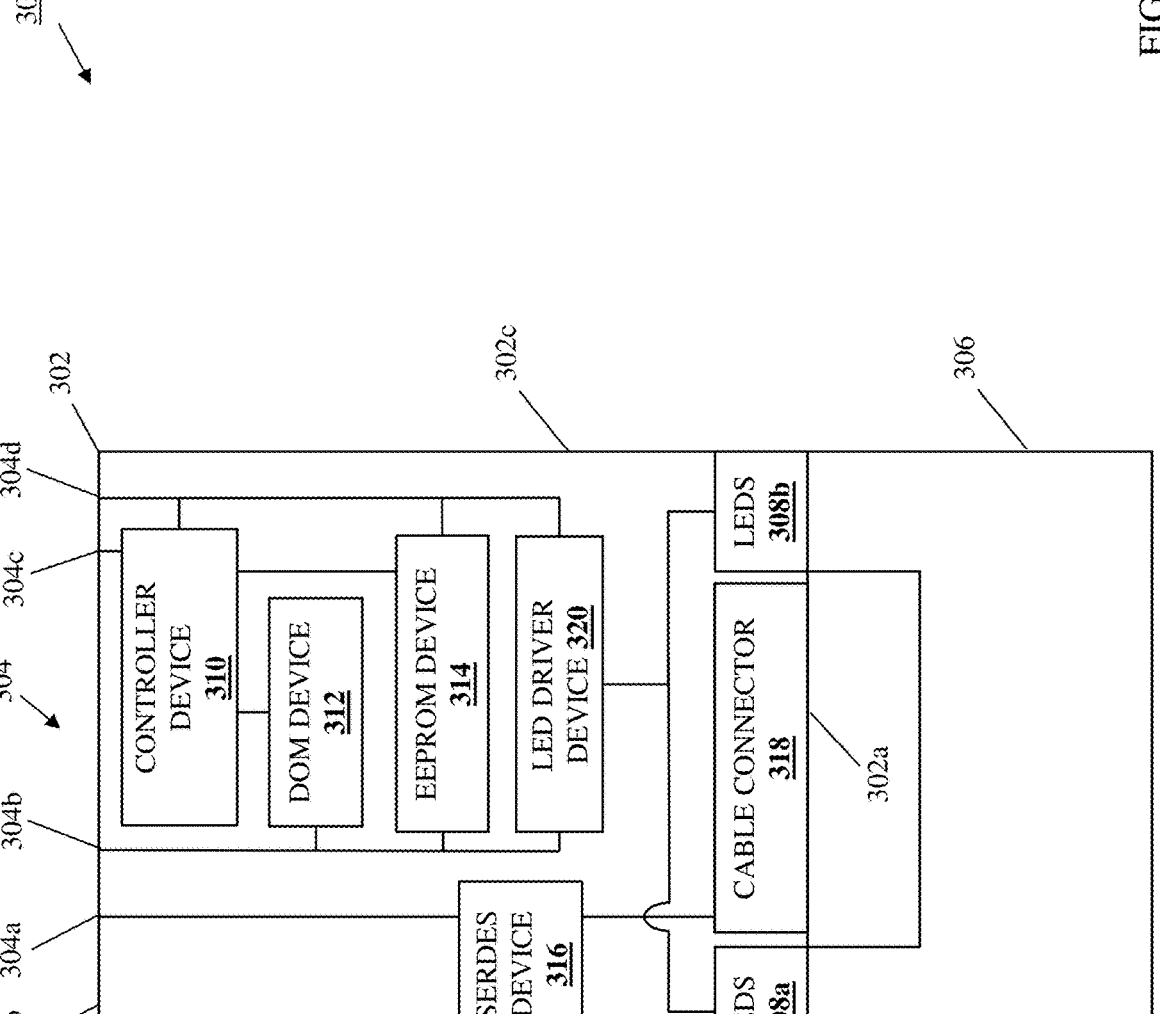
FIG. 3 is a schematic view illustrating an embodiment of the transceiver device of FIG. 2.

Referring now to FIG. 3, an embodiment of a transceiver device 300 is illustrated that may provide the transceiver device 200 discussed above with reference to FIG. 2. As such, the transceiver device 300 may be utilized with the IHS 100 discussed above with reference to FIG. 1, and thus may provide one of the components of the IHS 100, and in specific examples may be provided by a QSFP-DD optical transceiver device, although other types of transceiver devices will fall within the scope of the present disclosure as well. The transceiver device 300 includes a transceiver chassis 302 that may provide the transceiver chassis 202 discussed above with reference to FIG. 2, and thus includes a front surface 302a, a rear surface 302b that is located opposite the transceiver chassis 302 from the front surface 302a, and a pair of side surfaces 302c and 302d that extend between the front surface 302a and the rear surface 302b and that are located opposite the transceiver chassis 302 from each other.

The transceiver device 300 also includes a computing device connector 304 that is located on the transceiver chassis 302 adjacent the rear surface 302b and that may provide the computing device connector 204 discussed above with reference to FIG. 2. In the examples provided below, the computing device connector 304 includes a line interface connection 304a, an Inter-Integrated Circuit (I2C) connection 304b (e.g., including a Serial Data (SDA) line and a Serial Clock (SCL) line), a Field Programmable Gate Array (FPGA) connection 304c (e.g., PMode line, a Module Present Low (ModPrsL) line, a Module Select (ModSel) line, a Low Power Mode (LPMode) line, and a Reset Low (ResetL) line, and a power connection 304d (e.g., including a positive supply voltage (Vcc) line and a Ground (GND) line), although other connectors and/or connections will fall within the scope of the present disclosure as well. The transceiver device 300 also includes a transceiver device handle 306 that extends from the front surface 302a of the transceiver chassis 302 and that may provide the transceiver device handle 206 discussed above with reference to FIG. 2.

As discussed above, the transceiver chassis 302 may include the visual temperature indicator subsystem that is configured to indicate a temperature of the transceiver device 300. In the specific examples provided below, the visual temperature indicator subsystem is provided by the transceiver device handle 306 and an LED system that includes a plurality of LEDs 308a and 308b (e.g., "arrays" of LEDs 308a and 308b). As described in further detail below, the transceiver device handle 306 may be provided by light guides and/or clear/translucent materials that are configured to provide illumination using light emitted from the LEDs 308a and 308b and, in some embodiments, the transceiver device handle 306 may be provided by materials that are configured to diffuse that light (i.e., spread that light across the outer surface of the transceiver device handle 306 in a substantially uniform manner) to cause the outer surface of the transceiver device handle 306 to illuminate as described in further detail below. Furthermore, as discussed below, in some embodiments the LEDs 308a and 308b in the LED system may be configured to provide multiple different colors of light when illuminated.

However, similarly as described above, while a specific example of the visual temperature indicator subsystem of the present disclosure is illustrated and described below as being provided by the transceiver device handle 306 and LEDs 308a and 308b, one of skill in the art in possession of the present disclosure will appreciate how the transceiver chassis 302 may include a variety of visual temperature indicator subsystems (e.g., LEDs, displays, etc.) that are configured to indicate a temperature of the transceiver device 300 and that may be provided in any location on the transceiver device chassis 302 while remaining within the scope of the present disclosure as well.

As can be seen in FIG. 3, the transceiver device chassis 302 may house the components of the transceiver device 300, only some of which are illustrated and described below. For example, the transceiver device chassis 302 may house a controller device 310 that is coupled to the FPGA connection 304c and the power connection 304d on the computing device connector 304, and that may be provided by a micro controller device that may include a processor along with memory device(s) that include instructions that, when executed by the processor, cause the processor to provide a visual temperature indicator activation engine that is configured to perform the functionality of the visual temperature indicator activation engines and/or visual temperature indicator activation subsystems discussed below.

The transceiver device chassis 302 may also house a Digital Optical Monitoring (DOM) device 312 that is coupled to the controller device 310 and to the I2C connection 304b on the computing device connector 304, and that may be accessible at address "0x51" via the I2C connection 304b. As will be appreciated by one of skill in the art in possession of the present disclosure, the DOM device 312 may be configured to monitor and store operational parameters of the transceiver device 300 including the temperature of the transceiver device 300, a transceiver device supply voltage for the transceiver device 300, a laser bias current in the transceiver device 300, a transmit (TX) and receive (RX) optical power for the transceiver device 300 (i.e., a strength of optical signals emitted by a transmitter in the transceiver device 300 and received by a receiver in the transceiver device 300), and/or any other operational parameters that would be apparent to one of skill in the art in possession of the present disclosure.

The transceiver device chassis 302 may also house an Electrically Erasable Programmable Read-Only Memory (EEPROM) device 314 that is coupled to the controller device 310, the I2C connection 304b on the computing device connector 304, and the power connection 304d on the computing device connector 304, and that may be accessible at address "0x50" via the I2C connection 304b. As will be appreciated by one of skill in the art in possession of the present disclosure, the EEPROM device 314 may be configured to store information about the transceiver device 300 that may include identification and configuration information for the transceiver device 300, operational parameters for the transceiver device 300, event logs for the transceiver device 300, certificates and encryption keys for the transceiver device 300, information about the capabilities of the transceiver device 300, details about an LED driver Integrated Circuit (IC) in the transceiver device 300, a number and type of the LEDs 308a and 308b in the transceiver device 300, and/or any other information for the transceiver device 300 that one of skill in the art in possession of the present disclosure would recognize as enabling the functionality discussed below.

The transceiver device chassis 302 may also house a SERializer/DESerializer (SERDES) device 316 (e.g., including SERDES drivers) that is coupled to line interface connection 304a on the computing device connector 304. The transceiver device chassis 302 may also house a cable connector 318 that is coupled to the SERDES devices 316 and that is configured to connect a cable (not illustrated) to the transceiver device 300. As will be appreciated by one of skill in the art in possession of the present disclosure, the SERDES device 314 may use any of a variety of data transmission techniques known in the art to transmit data packets between a networking device connected to the computing device connector 304 on the transceiver device 300, and a cable connected to the cable connector 318 on the transceiver device 300.

The transceiver device chassis 302 may also house a visual temperature indicator subsystem that is provided in the illustrated examples by an LED driver device 320 that is coupled to the I2C connection 304b and the power connection 304d on the computing device connector 304, as well as to the LEDS 308a and 308b that are configured to illuminate immediately adjacent the transceiver device handle 306, although one of skill in the art in possession of the present disclosure will appreciate how other types of visual temperature indication subsystems will fall within the scope of the present disclosure as well. As will be appreciated by one of skill in the art in possession of the present disclosure, the LED driver device 320 may be configured to perform a variety of driver functionality for the LEDS 308a and 308b including power regulation, current control, voltage conversion, dimming control, current and voltage fluctuation protection, temperature compensation (e.g., power level adjustment based on LED temperature), and/or other LED driver functionality that would be apparent to one of skill in the art in possession of the present disclosure. However, while a specific transceiver device 300 has been illustrated and described, one of skill in the art in possession of the present disclosure will appreciate that transceiver devices may include a variety of components and/or component configurations for providing conventional transceiver functionality, as well as the transceiver temperature alert functionality described below, while remaining within the scope of the present disclosure as well.

Figure 4A:
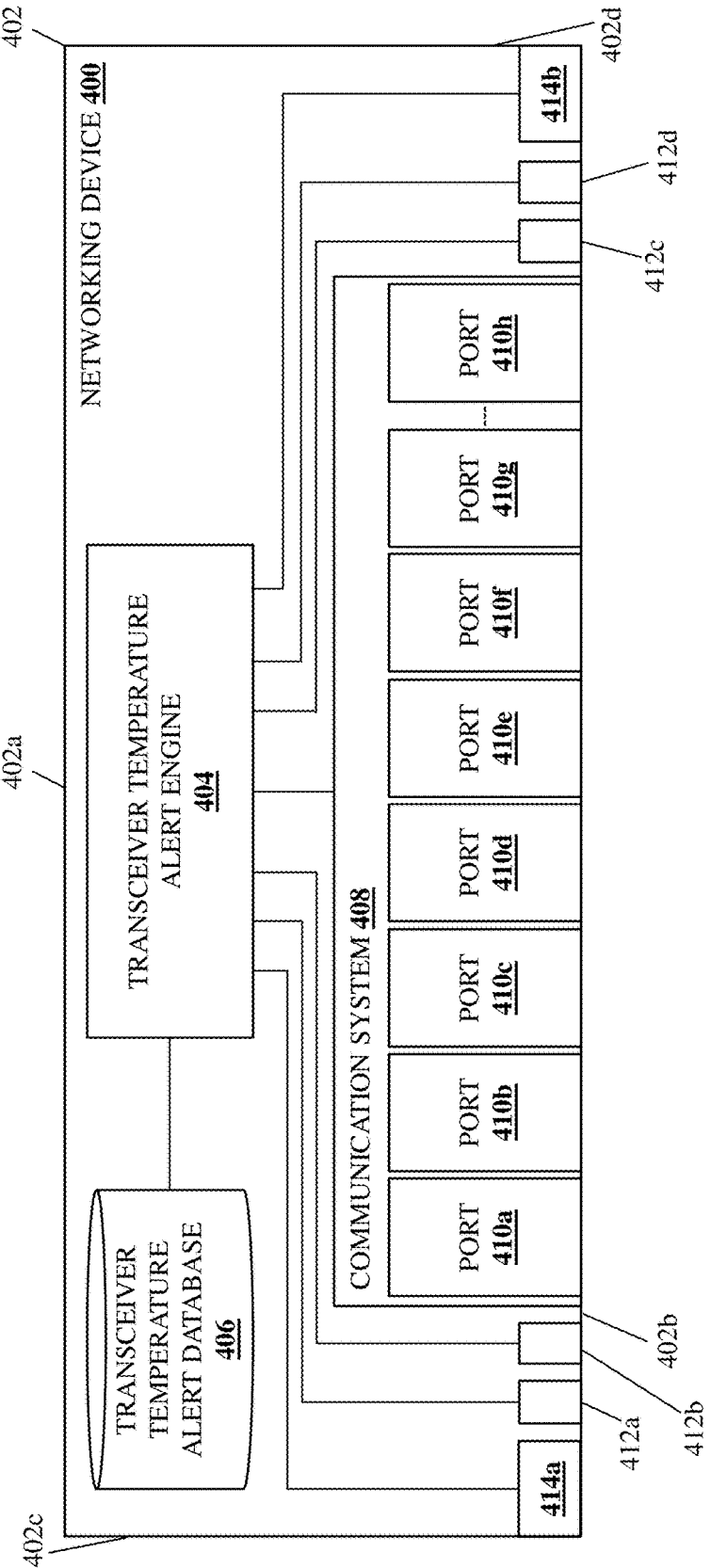
FIG. 4A is a schematic view illustrating an embodiment of a networking device that may be included in the transceiver temperature alert system of the present disclosure.

Referring now to FIG. 4A, an embodiment of a networking device 400 is illustrated that may be included in the transceiver temperature alert system of the present disclosure. In an embodiment, the networking device 400 may be provided by the IHS 100 discussed above with reference to FIG. 1, and/or may include some or all of the components of the IHS 100, and in specific examples may be provided by a switch device, a router device, and/or other networking devices known in the art. In the illustrated embodiment, the networking device 400 includes a chassis 402 that houses the components of the networking device 400, only some of which are illustrated and discussed below. The chassis 402 includes a rear wall 402a, a front wall 402b that is located opposite the chassis 402 from the rear wall 402a, and a pair of side walls 402c and 402d located opposite one another on the chassis 402 and that extend between the rear wall 402a and the front wall 402b.

The chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a transceiver temperature alert engine 404 that is configured to perform the functionality of the transceiver temperature alert engines, transceiver temperature alert subsystems, and or networking devices discussed below. The chassis 402 may also house a storage system (not illustrated, but which may include the storage device 108 discussed above with reference to FIG. 1) that is coupled to the transceiver temperature alert engine 404 (e.g., via a coupling between the storage system and the processing system) and that may include a transceiver temperature alert database 406 that is configured to store any of the information utilized by the transceiver temperature alert engine 404 as discussed below.

The chassis 402 may also house a communication system 408 that includes a plurality of ports 410a, 410b, 410c, 410d, 410e, 410f, 410g, and up to 410h, that is coupled to the transceiver temperature alert engine 404 (e.g., via a coupling between the communication system 408 and the processing system), and that may include any of a variety of networking communication components that would be apparent to one of skill in the art in possession of the present disclosure. In the specific examples illustrated and discussed below, the ports 410a-410h are configured to receive QSFP transceiver devices (e.g., QSFP-DD transceiver devices), but one of skill in the art in possession of the present disclosure will appreciate that other types of transceiver devices will fall within the scope of the present disclosure as well. In the illustrated examples, the chassis 402 also houses a plurality of human presence sensor device pairs 412a/412b and 412c/412d that are located adjacent the front wall 402b on opposite sides of the ports 410a-410h, and that are each coupled to the transceiver temperature alert engine 404 (e.g., via respective Universal Asynchronous Receiver-Transmitter (UART) connections or other couplings between the human presence sensor device pairs 412a/412b and 412c/412d and the transceiver temperature alert engine 404.)

As will be appreciated by one of skill in the art in possession of the present disclosure, the human presence sensor device pairs 412a/412b and 412c/412d may be configured to detect a human adjacent the networking device 400 and, in response, generate and transmit an alert to the transceiver temperature alert engine 404 via interrupts or other alert techniques known in the art. As such, the human presence sensor device pairs 412a/412b and 412c/412d may be provided by motion sensors, facial recognition sensors, noise sensors, heat sensors, and/or any other sensors that one of skill in the art in possession of the present disclosure would recognize as providing the human presence detection functionality described below.

The chassis 402 may also house a pair of alarm devices 414a and 414b that are located adjacent the human presence sensor device pairs 412a/412b and 412c/412d, and that are each coupled to the transceiver temperature alert engine 404 (e.g., via a respective General Purpose Input/Output (GPIO) connection or other coupling between the alarm device(s) 414a and 414b and the processing system). In a specific example, the alarm devices 414a and 414b may be provided by piezo buzzers, although other alarm devices will fall within the scope of the present disclosure as well. However, while a particular networking device has been illustrated and described, one of skill in the art in possession of the present disclosure will appreciate how networking devices included in the transceiver temperature alert system of the present disclosure may include a variety of components and/or component configurations while remaining within the scope of the present disclosure as well.

Figure 4B:
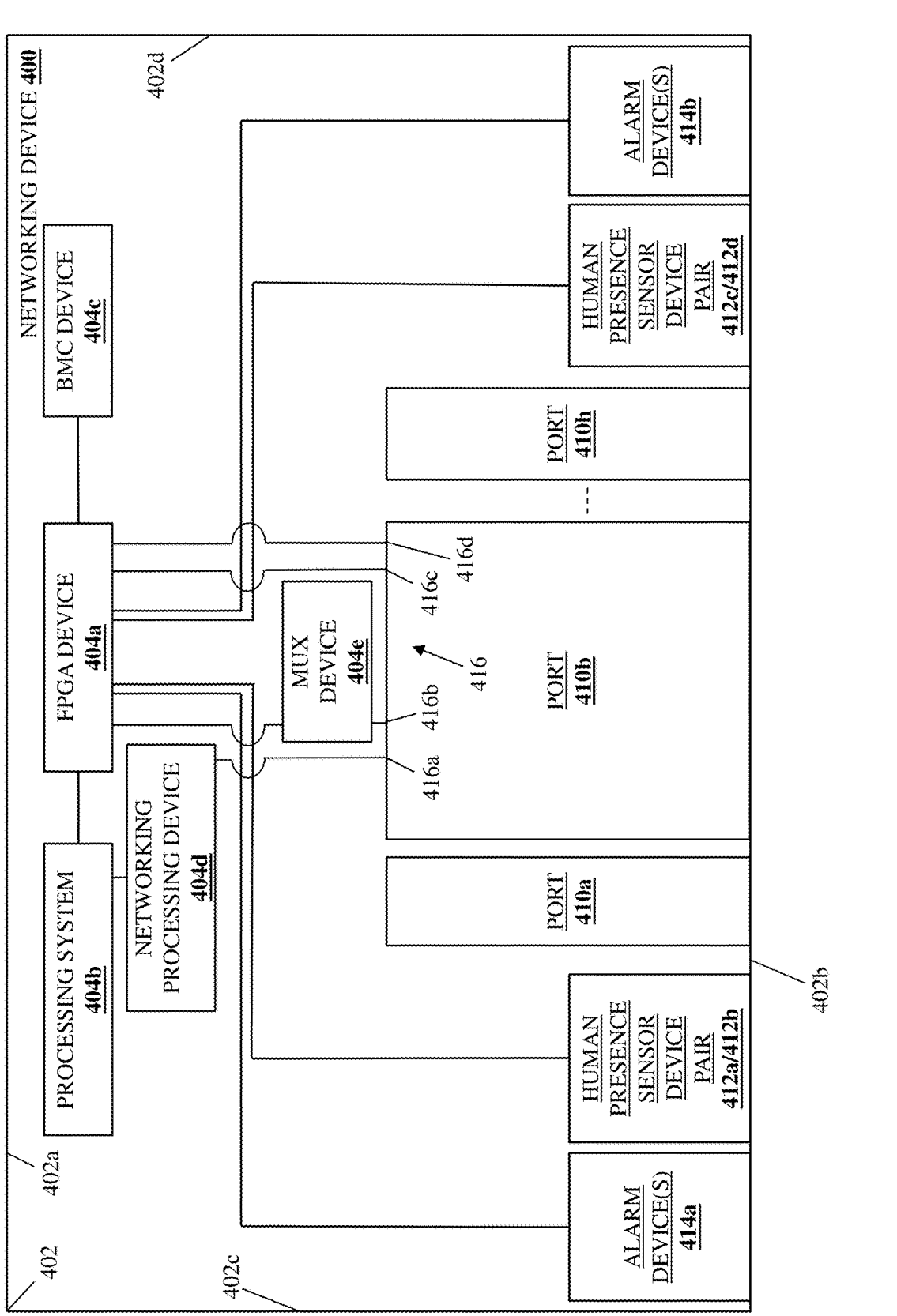
FIG. 4B is a schematic view illustrating an embodiment of the networking device of FIG. 4A.

With reference to FIG. 4B, an embodiment of the networking device 400 is illustrated that provides a specific example of the transceiver temperature alert engine 404 discussed above with reference to FIG. 4A. As can be seen, the transceiver temperature alert engine 404 may include a FPGA device 404a that is coupled to a processing system 404b and a Baseboard Management Controller (BMC) device 404c. For example, the processing system 404b may be provided by a Central Processing Unit (CPU) System on Chip (SoC) that is configured to provide a Network Operating System (NOS) for the networking device 400, and the BMC device 404c may be configured to provide a BMC Operating System (OS) that is configured to manage the networking device 400. The transceiver temperature alert engine 404 may also include a networking processing device 404d that is coupled to the processing system 404b and that may be provided by a Network Processing Unit (NPU) including a Media Access Control (MAC)/PHYsical layer (PHY) subsystem. The transceiver temperature alert engine 404 may also include a multiplexer (MUX) device 404e that is coupled to the FPGA device 404a.

FIG. 4B illustrates the connections of the transceiver temperature alert engine 404 to a port connector 416 on the port 410b, and one of skill in the art in possession of the present disclosure will appreciate how the transceiver temperature alert engine 404 may be connected to the ports 410a and 410c-410h similarly as illustrated for the port 410b. As can be seen in FIG. 4B the networking processing device 404d is coupled to a line interface connection 416a on the port connector 416 that one of skill in the art in possession of the present disclosure will appreciate allows the networking processing device 404d to send and receive data via the port connector 416. As also can be seen in FIG. 4B, the multiplexer device 404e is coupled to an I2C connection 416b on the port connector 416 that one of skill in the art in possession of the present disclosure will appreciate allows the FPGA device 404a to transmit Serial Data (SDA) signals and Serial Clock (SCL) signals via the port connector 416.

As also can be seen in FIG. 4B, the FPGA device 404a is coupled to the human presence sensor pairs 412a/412b and 412c/412d (e.g., via the UART connections discussed above); the alarm devices 414a and 414b (e.g., via the GPIO connection discussed above); a FPGA connection 416c on the port connector 416 that one of skill in the art in possession of the present disclosure will appreciate allows the FPGA device 404a to transmit PMode signals, ModPrsL signals, ModSel signals, LPMode signals, and ResetL signals via the port connector 416; and a power connection 416d on the port connector 416 that one of skill in the art in possession of the present disclosure will appreciate allows the FPGA device 404a to provide power (e.g., Vcc and GND) via the port connector 416. However, while a specific example of the transceiver temperature alert engine of the present disclosure has been illustrated and described and is utilized in the examples provided below, one of skill in the art in possession of the present disclosure will appreciate how the functionality of the transceiver temperature alert engine discussed below may be provided in a variety of manners that will fall within the scope of the present disclosure as well.

Figure 5:
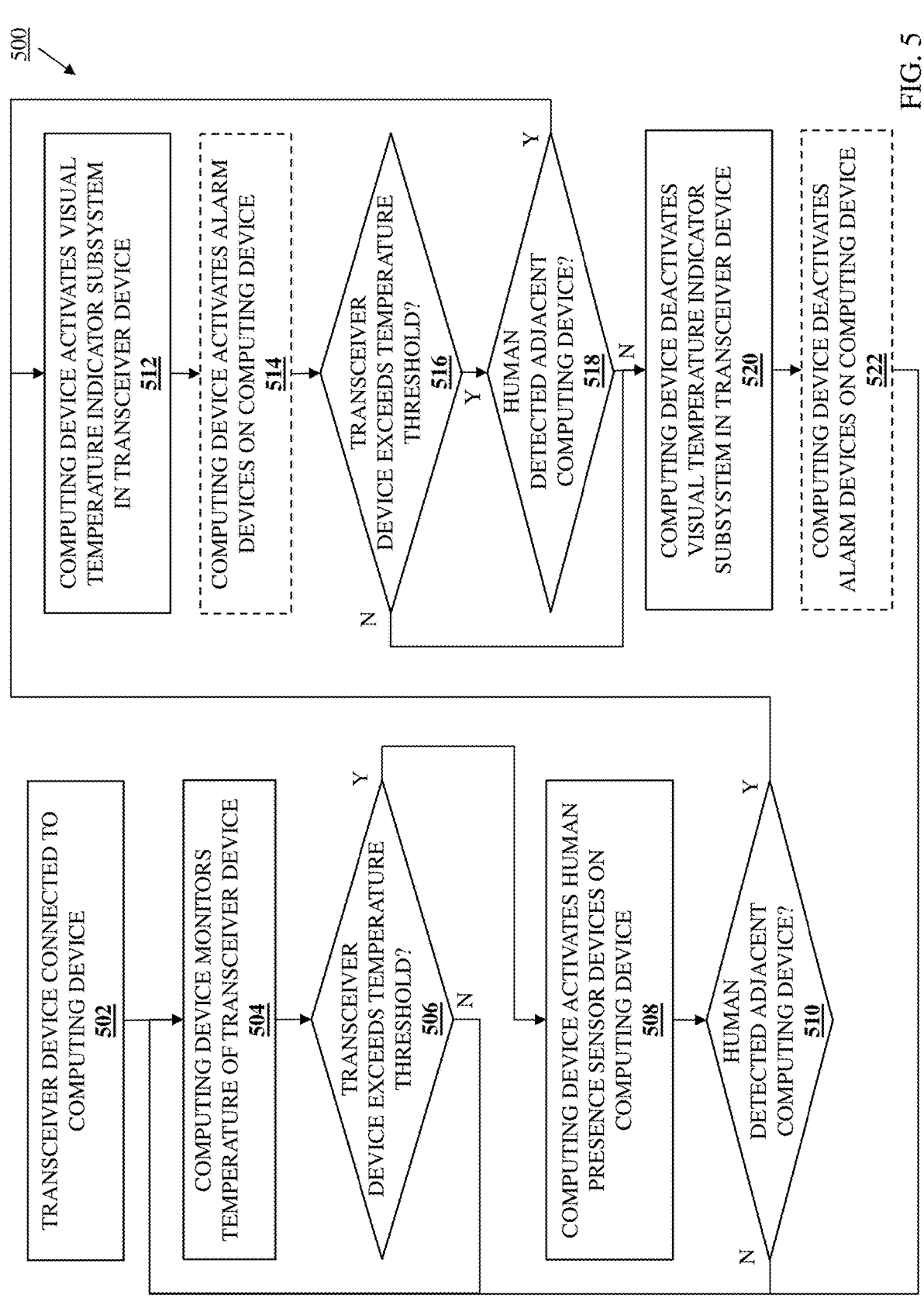
FIG. 5 is a flow chart illustrating an embodiment of a method for providing alerts about the temperature of a transceiver device.

Referring now to FIG. 5, an embodiment of a method 500 for providing alerts about a temperature of a transceiver device is illustrated. As discussed below, the systems and methods of the present disclosure provide visual indications about the temperature of transceiver devices operating with a computing device. For example, the transceiver temperature alert system of the present disclosure may include a transceiver device that includes a transceiver device chassis. A computing device connector is included on the transceiver device chassis and is configured to connect to a computing device. A visual temperature indicator subsystem is included on the transceiver device chassis. A visual temperature indicator activation subsystem is housed in the transceiver device chassis, and is coupled to the computing device connector and the visual temperature indicator subsystem. The visual temperature indicator activation subsystem may receive a visual temperature indicator activation command from the computing device and, in response, activate the visual temperature indicator subsystem included on the transceiver device to produce a visual indication of a temperature of the transceiver device. As such, users may be alerted to the temperature of transceiver devices without being required to perform the cumbersome conventional transceiver temperature retrieval operations discussed above.

Figure 6:
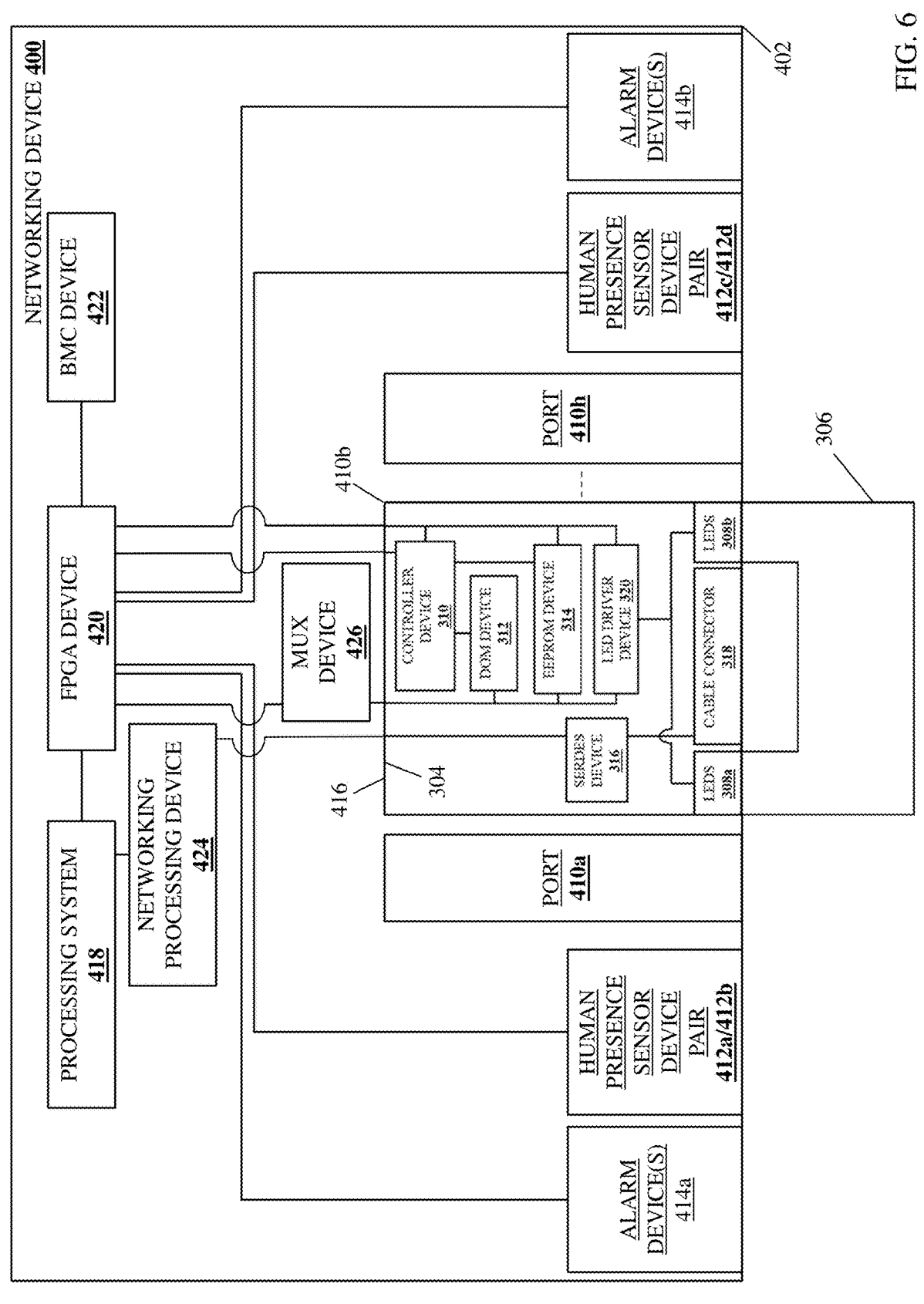
FIG. 6 is a schematic view illustrating an embodiment of the transceiver device of FIG. 3 connected to the networking device of FIG. 4B during the method of FIG. 5.

The method 500 begins at block 502 where a transceiver device is connected to a computing device. With reference to FIG. 6, in an embodiment of block 502, the transceiver device 300 discussed above with reference to FIG. 3 may be connected to the networking device 400 discussed above with reference to FIG. 4 by positioning the transceiver device 300 adjacent the networking device 400 such that the computing device connector 304 included on the transceiver device 300 is aligned with the port 410b included on the networking device 400. The transceiver device 300 may then be moved into the port 410b until the computing device connector 304 engages the port connector 416 in the port 410b.

As can be seen in FIG. 6, when the computing device connector 304 is engaged with the port connector 416 in the port 410b, the line interface connection 304a, the I2C connection 304b, the FPGA connection 304c, and the power connection 304d included on the computing device connector 304 (illustrated in FIG. 3) connect to the line interface connection 416a, the I2C connection 416b, the FPGA connection 416c, and the power connection 416d, respectively, included on the port connector 416 (illustrated in FIG. 4B). As will be appreciated by one of skill in the art in possession of the present disclosure, a transceiver device may be connected to any of the ports 410a and up to 410h in a similar manner.

Figure 7:
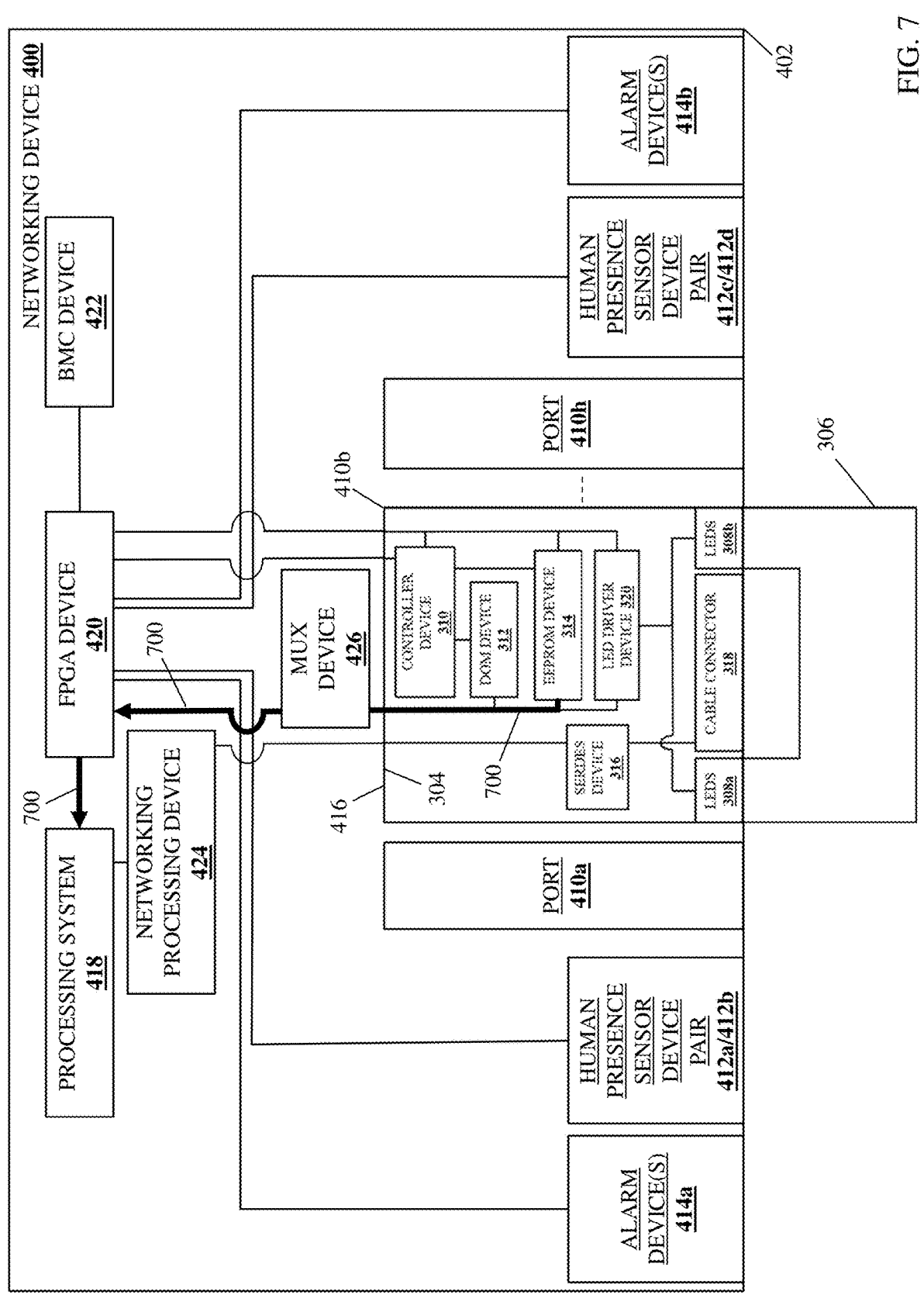
FIG. 7 is a schematic view illustrating an embodiment of the transceiver device and the networking device of FIG. 6 operating during the method of FIG. 5.

With reference to FIG. 7, following the connection of the transceiver device 300 to the networking device 400 or upon any initialization of the networking device 400 while the transceiver device 300 is connected to the networking device 400, the NOS provided by the processing system 418 may detect the presence of the transceiver device 300 in the port 410b and, in response, may perform EEPROM information retrieval operations 700 that may include retrieving information about the transceiver device 300 stored in the EEPROM device 314 via the FPGA device 420 and the multiplexer device 426. For example, the information retrieved from the EEPROM device 314 by the NOS may include information that identifies that the transceiver device 300 is capable of operating with the transceiver temperature alert system of the present disclosure, and/or any other information that one of skill in the art in possession of the present disclosure would recognize as enabling the functionality described below.

Figure 8:
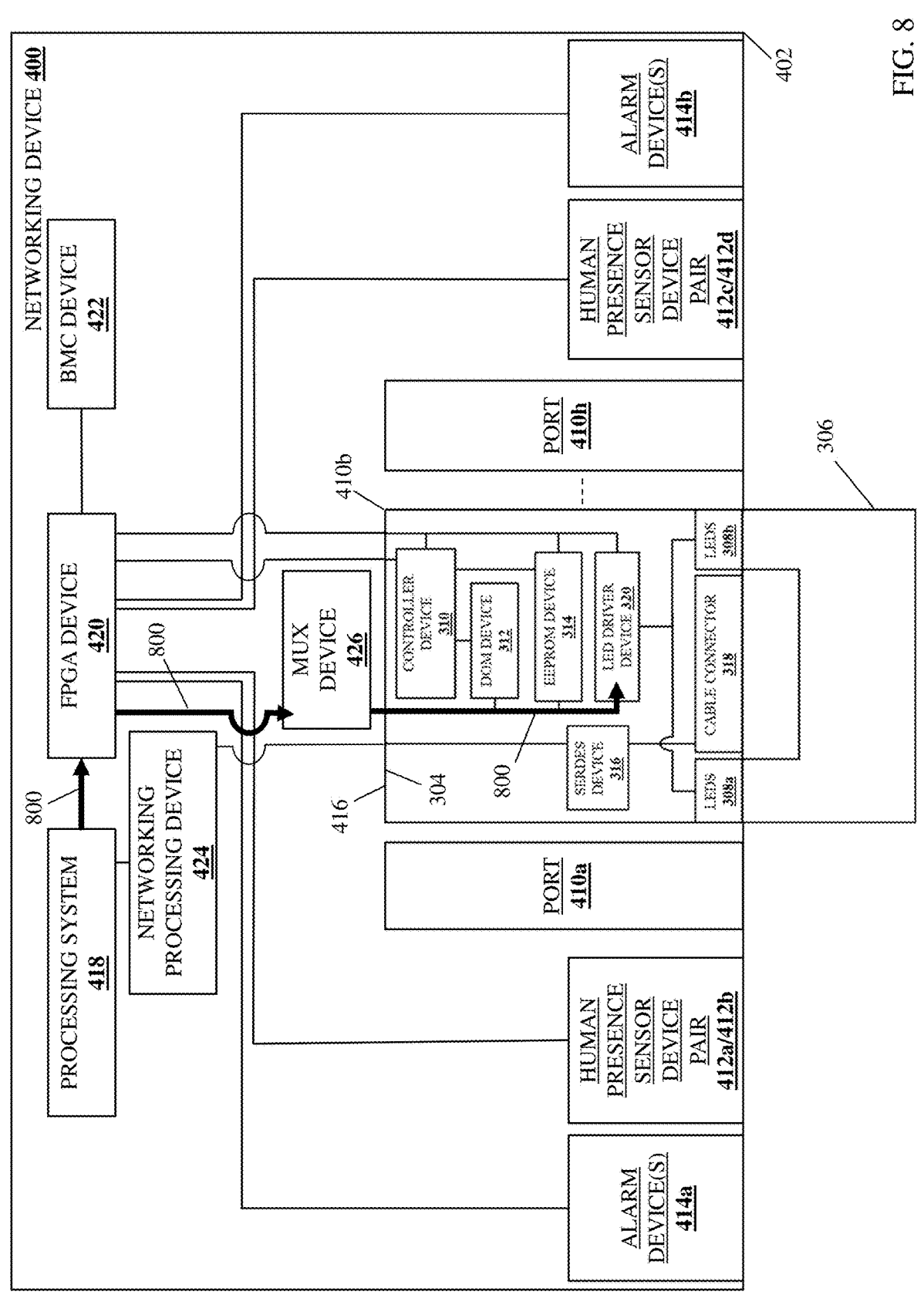
FIG. 8 is a schematic view illustrating an embodiment of the transceiver device and the networking device of FIG. 6 operating during the method of FIG. 5.

With reference to FIG. 8, in response to determining that the transceiver device 300 is capable of operating with the transceiver temperature alert system of the present disclosure, the NOS provided by the processing system 418 may perform LED driver device initialization operations 800 that may include initializing the LED driver device 320 via the FPGA device 420 and the multiplexer device 426, and one of skill in the art in possession of the present disclosure will appreciate that neither of the LEDS 308*a* and 308*b* will be active/illuminated following the initialization of the LED driver device 320. However, while a specific example of some operations performed following the connection of the transceiver device 300 to the port 410*b* of the networking device 400 have been illustrated and described, one of skill in the art in possession of the present disclosure will appreciate how the transceiver device of the present disclosure may be configured to perform the functionality described below in a variety of manners that will fall within the scope of the present disclosure as well.

Figure 9:
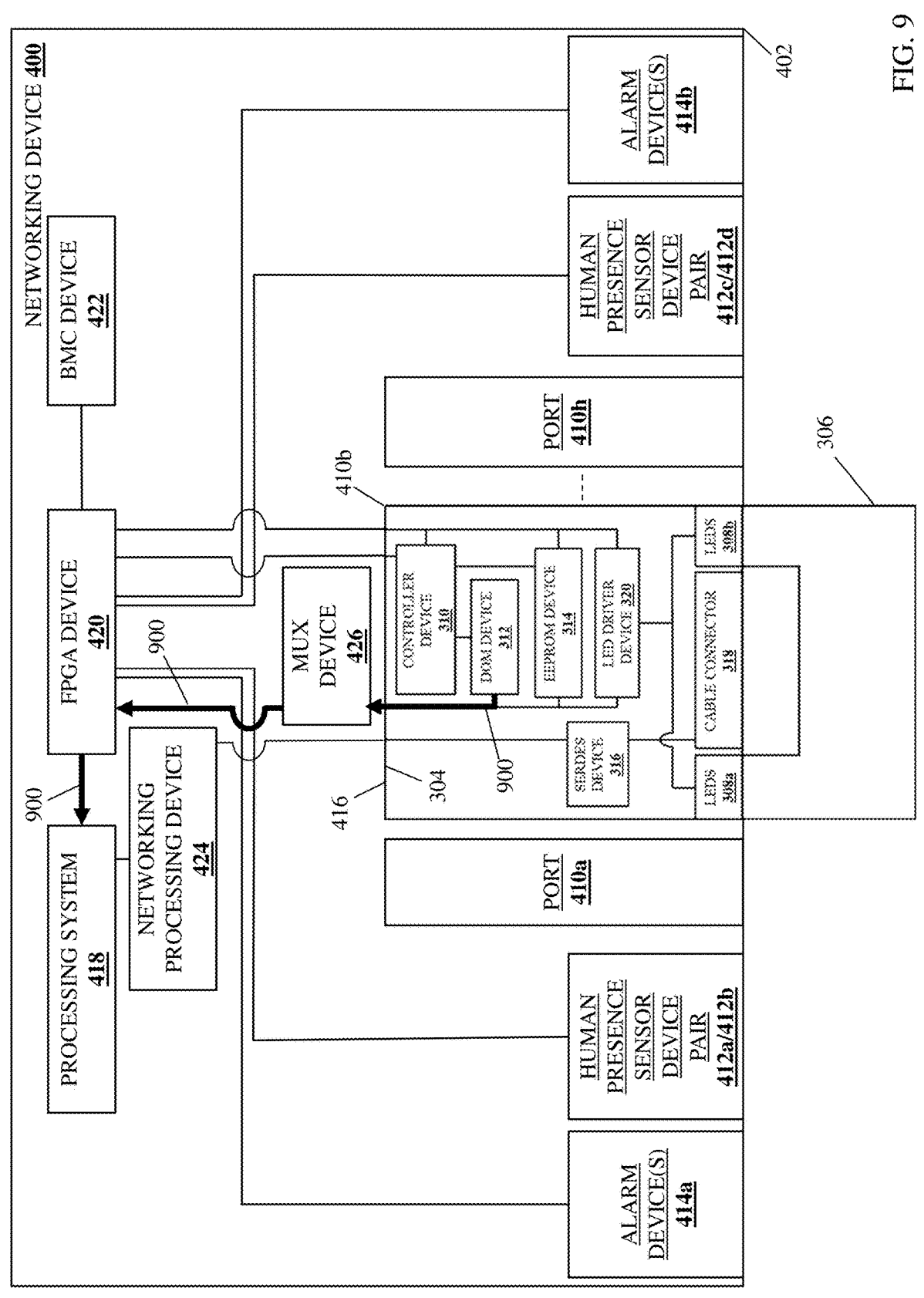
FIG. 9 is a schematic view illustrating an embodiment of the transceiver device and the networking device of FIG. 6 operating during the method of FIG. 5.

The method 500 then proceeds to block 504 where the computing device monitors the temperature of the transceiver device. With reference to FIG. 9, in an embodiment of block 504, the NOS provided by the processing system 418 may perform temperature monitoring operations 900 that may include retrieving temperature information about the transceiver device 300 from the DOM device 312 via the FPGA device 420 and the multiplexer device 426. As will be appreciated by one of skill in the art in possession of the present disclosure, the DOM device 312 may be configured to identify and store the current temperature of the transceiver device 300, and the NOS may operate to periodically poll the DOM device 312 following the connection of the transceiver device 300 to the port 410*b* to identify the current temperature of the transceiver device 300 stored in the DOM device 312 at block 504. As such, one of skill in the art in possession of the present disclosure will appreciate how the transceiver device temperature monitoring at block 504 may be performed throughout the method 500. However, while a specific technique for monitoring the temperature of a transceiver device has been described, one of skill in the art in possession of the present disclosure will appreciate how the temperature of the transceiver device may be monitored using other techniques that will fall within the scope of the present disclosure as well.

The method 500 then proceeds to decision block 506 where the method 500 proceeds depending on whether the transceiver device exceeds a temperature threshold. In an embodiment, at decision block 506 and in response to retrieving the current temperature of the transceiver device 300 at block 504, the NOS provided by the processing system 418 may determine if the current temperature of the transceiver device 300 exceeds a temperature threshold. In the examples below, a plurality of different temperature thresholds are defined for the transceiver device 300 to provide for different activations of the visual temperature indications of the present disclosure (e.g., for temperatures between 35 and 45 degrees Celsius, temperatures between 45-55 degrees Celsius, and temperatures over 55 degrees Celsius). However, one of skill in the art in possession of the present disclosure will appreciate how a single temperature threshold, or different temperature thresholds than those utilized in the specific examples provided herein, may be utilized in the transceiver temperature alert system of the present disclosure while remaining within its scope.

If, at decision block 506, the transceiver device does not exceed the temperature threshold, the method 500 returns to block 504. As such, the method 500 may loop such that the computing device continues to monitor the transceiver device until the transceiver device exceeds the temperature threshold. Continuing with the specific example provided above, if at decision block 506 the NOS provided by the processing system 418 determines that the current temperature of the transceiver device 300 does not exceed 35 degrees Celsius, the NOS may continue to monitor the temperature of the transceiver device 300 at block 504 until the current temperature of the transceiver device 300 exceeds 35 degrees Celsius.

Figure 10A:
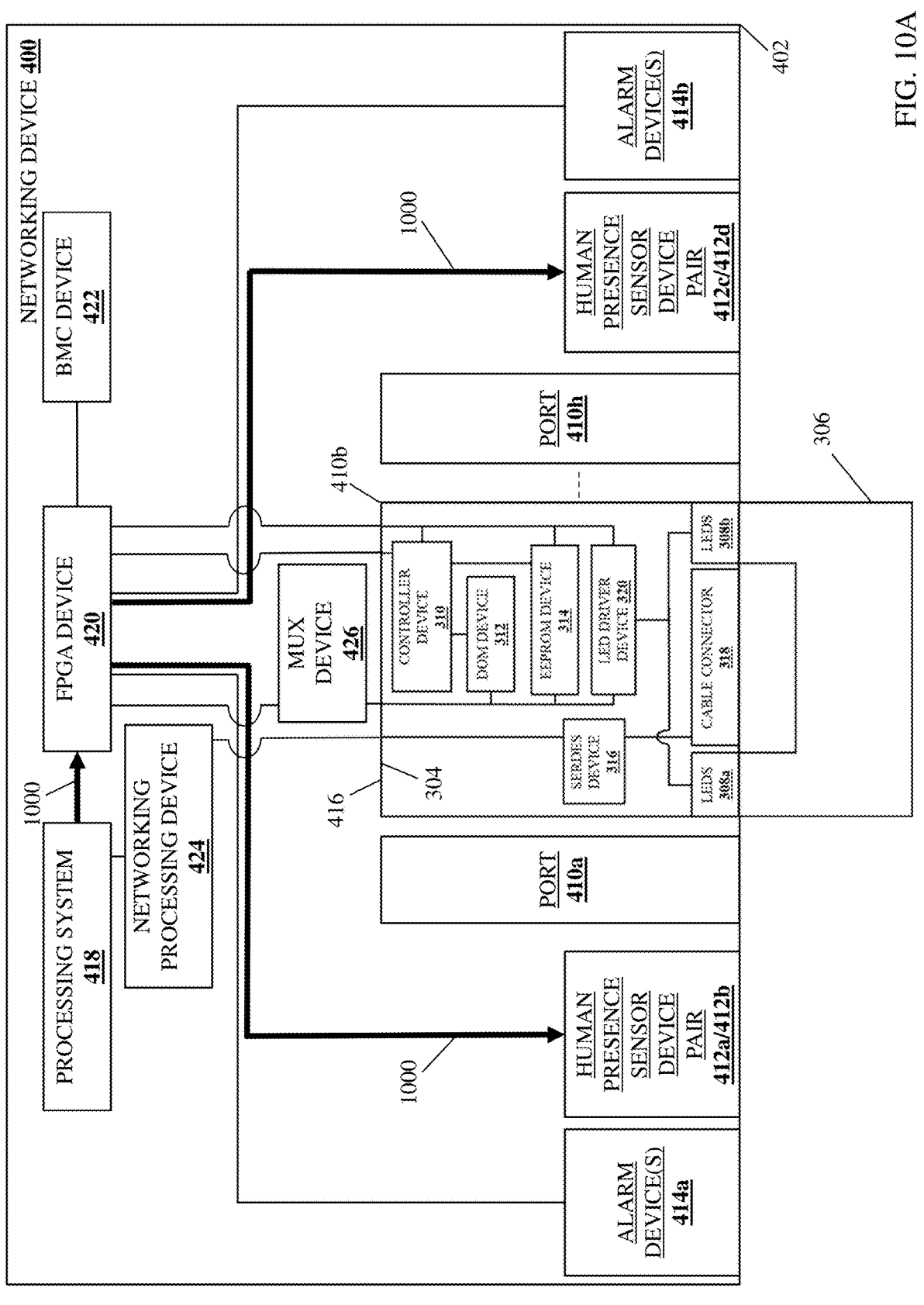
FIG. 10A is a schematic view illustrating an embodiment of the transceiver device and the networking device of FIG. 6 operating during the method of FIG. 5.

If, at decision block 506, the transceiver device exceeds the temperature threshold, the method 500 proceeds to block 508 where the computing device activates human presence sensor devices on the computing device. With reference to FIG. 10A, in an embodiment of block 508 and in response to determining that the temperature of the transceiver device 300 exceeds the temperature threshold, the NOS provided by the processing system 418 may perform human presence sensor device activation operations 1000 that may include activating the human presence sensor device pairs 412*a*/412*b* and 412*c*/412*d* via the FPGA device 420, which may cause the human presence sensor device pairs 412*a*/412*b* and 412*c*/412*d* to begin operating to detect for the presence of a human adjacent the networking device 400.

Figure 10B:
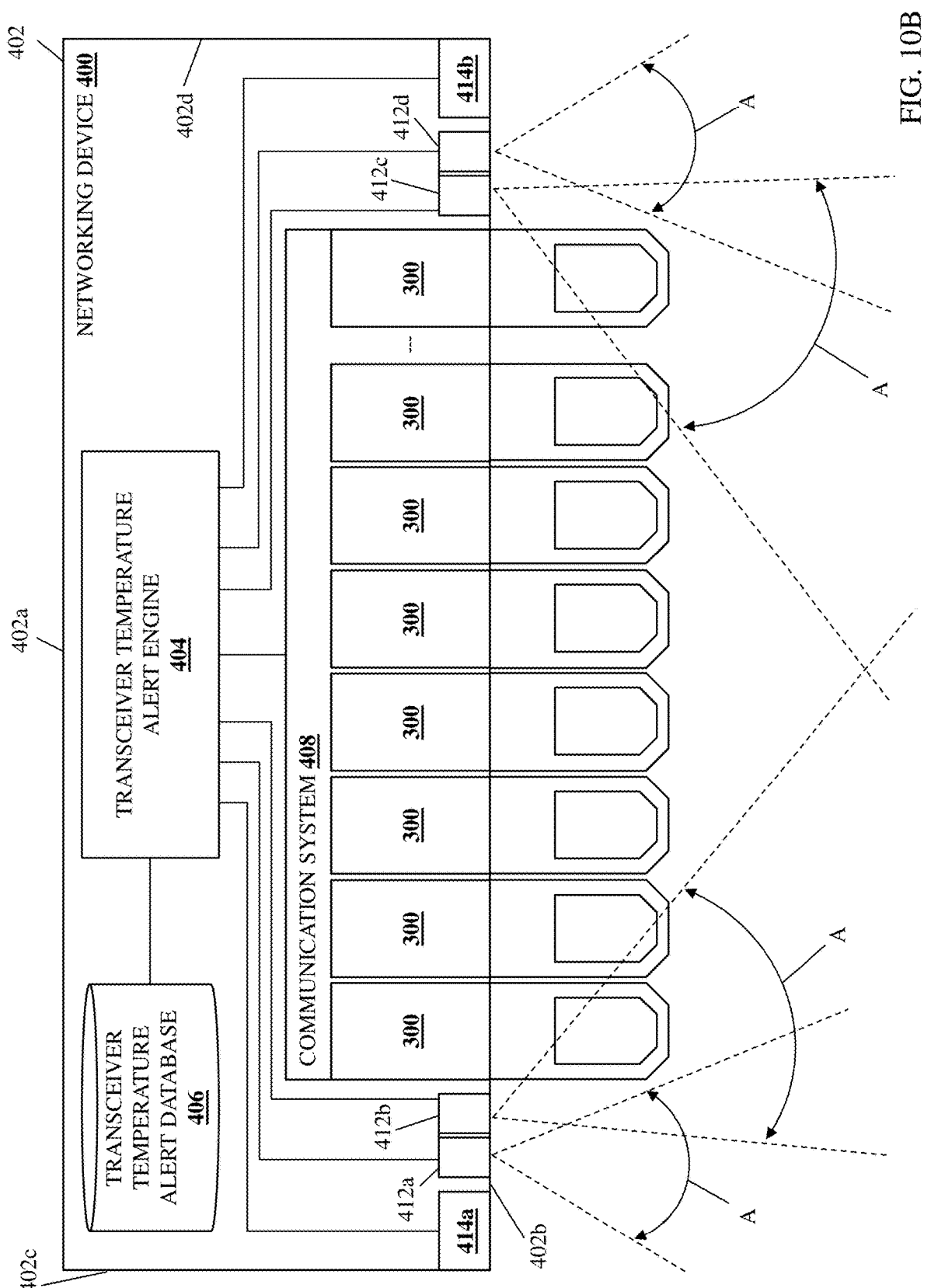
FIG. 10B is a schematic view illustrating an embodiment of the transceiver devices of FIGS. 2 and 3 connected to the networking device of FIG. 4A and operating during the method of FIG. 5.

With reference to FIG. 10B, in an embodiment of block 508 and in response to being activated, the human presence sensor device pairs 412*a*/412*b* and 412*c*/412*d* may perform human presence detection operations that may include monitoring the area adjacent the front wall 402*b* of the chassis 402 of the networking device 400 for the presence of a human. In the specific example illustrated in FIG. 10B, the human presence sensor device pairs 412*a*/412*b* and 412*c*/412*d* may be provided by wave radar sensors (e.g., 24 GHz millimeter wave radar sensors) that may each be configured to perform the human presence detection operations over an angle A (e.g., a 60-degree angle) which may provide for "human presence detection coverage" across the entirety of the front wall 402*b* of the chassis 402 on the networking device 400, as well as areas of redundant "human presence detection coverage" that provides for the detection of a human adjacent the networking device 400 even in the event of an unavailability of one of more of the human presence sensor devices 412*a*, 412*b*, 412*c*, and 412*d*. However, while a specific example of detecting the presence of a human adjacent the networking device 400 has been illustrated and described, one of skill in the art in possession of the present disclosure will appreciate that human presence may be detected using a variety of techniques that will fall within the scope of the present disclosure as well.

Furthermore, while the specific example of the transceiver temperature alert system of the present disclosure illustrated and discussed below provides visual temperature indications when humans are detected as being present adjacent the networking device 400, one of skill in the art in possession of the present disclosure will appreciate how the detection of human presence adjacent the networking device 400 may be omitted in some embodiments such that the transceiver temperature visual indications of the present disclosure are provided whenever transceiver devices exceed threshold temperatures.

The method 500 then proceeds to decision block 510 where the method 500 proceeds depending on whether a human is detected adjacent the computing device. As will be appreciated by one of skill in the art in possession of the present disclosure, the human presence sensor devices 412*a*, 412*b*, 412*c*, and 412*d* will be configured to detect a human located adjacent the front wall 402*b* on the chassis 402 of the networking device 400 prior to that human being able to engage any of the transceiver devices 300, as well as information about any human present adjacent the networking device 400 (e.g., a distance of that human from the front wall 402*b* on the chassis 402 of the networking device 400).

If, at decision block 510, a human is not detected adjacent the computing device, the method 500 returns to block 504. As such, the method 500 may loop such that the human presence sensor devices 412a, 412b, 412c and 412d will remain activated as long as any of the transceiver devices 300 exceed the temperature threshold in order to continue monitoring for the presence of a human adjacent the networking device 400.

Figure 10C:
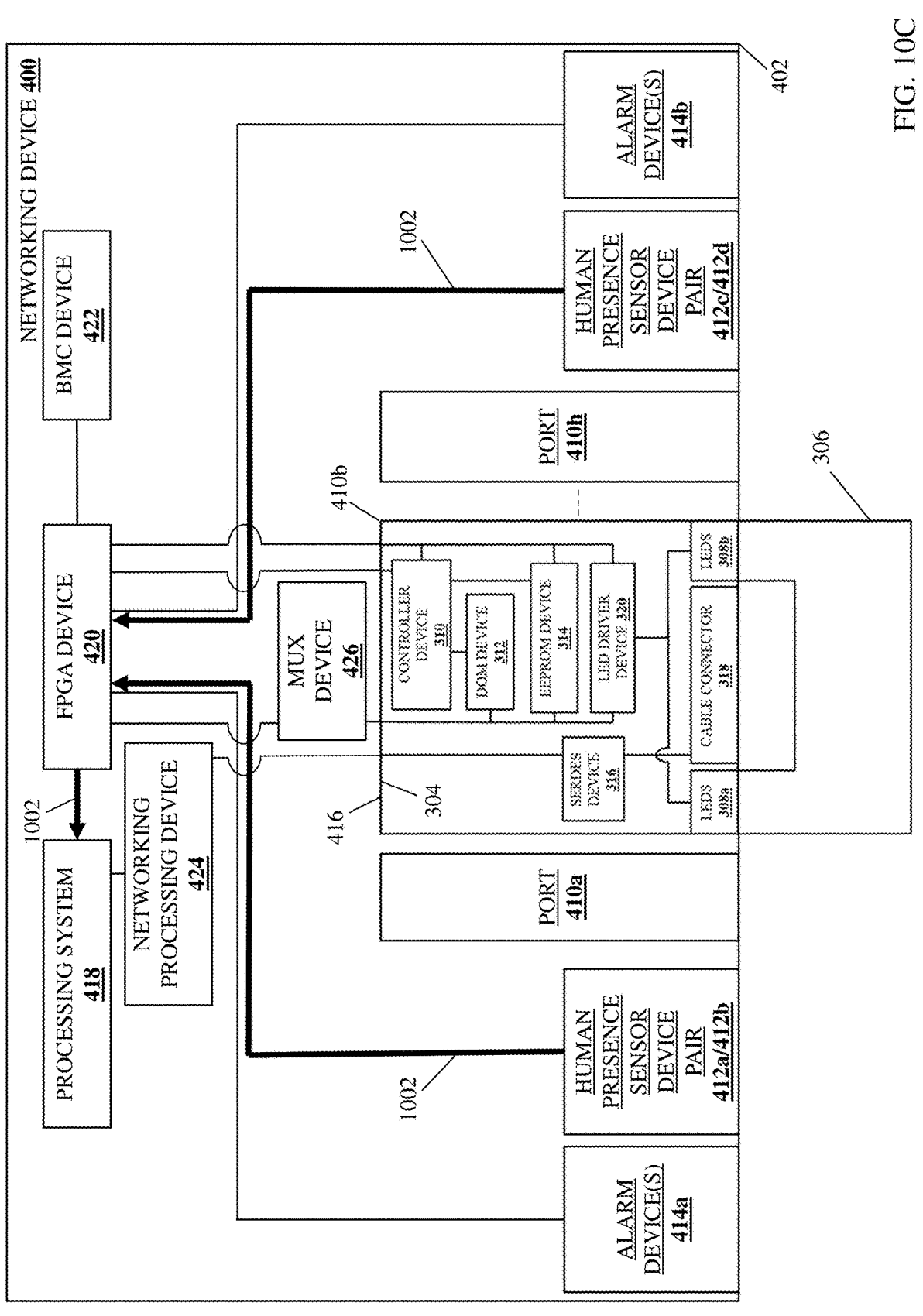
FIG. 10C is a schematic view illustrating an embodiment of the transceiver device and the networking device of FIG. 6 operating during the method of FIG. 5.

If, at decision block 510, a human is detected adjacent the computing device, the method 500 proceeds to block 512 where the computing device activates a visual temperature indicator subsystem in the transceiver device. With reference to FIG. 10C, at decision block 510 and in response to any of the human presence detector devices 412a, 412b, 412c, and 412d detecting the presence of a human based on the human presence detection operations performed as illustrated in FIG. 10B, any of the human presence detector devices 412a, 412b, 412c and 412d may perform human presence detection operations 1002 that includes identifying the presence of a human detected adjacent the networking device 400 to the NOS provided by the processing system 418 via the FPGA device 420. As will be appreciated by one of skill in the art in possession of the present disclosure, the human presence identification operations 1002 may include the NOS querying the human presence sensor devices 412a, 412b, 412c and 412d via the UART connection discussed above, the human presence sensor devices 412a, 412b, 412c, and 412d transmitting a human presence identification interrupt, and/or any other human presence identification communications that would be apparent to one of skill in the art in possession of the present disclosure.

Figure 11A:
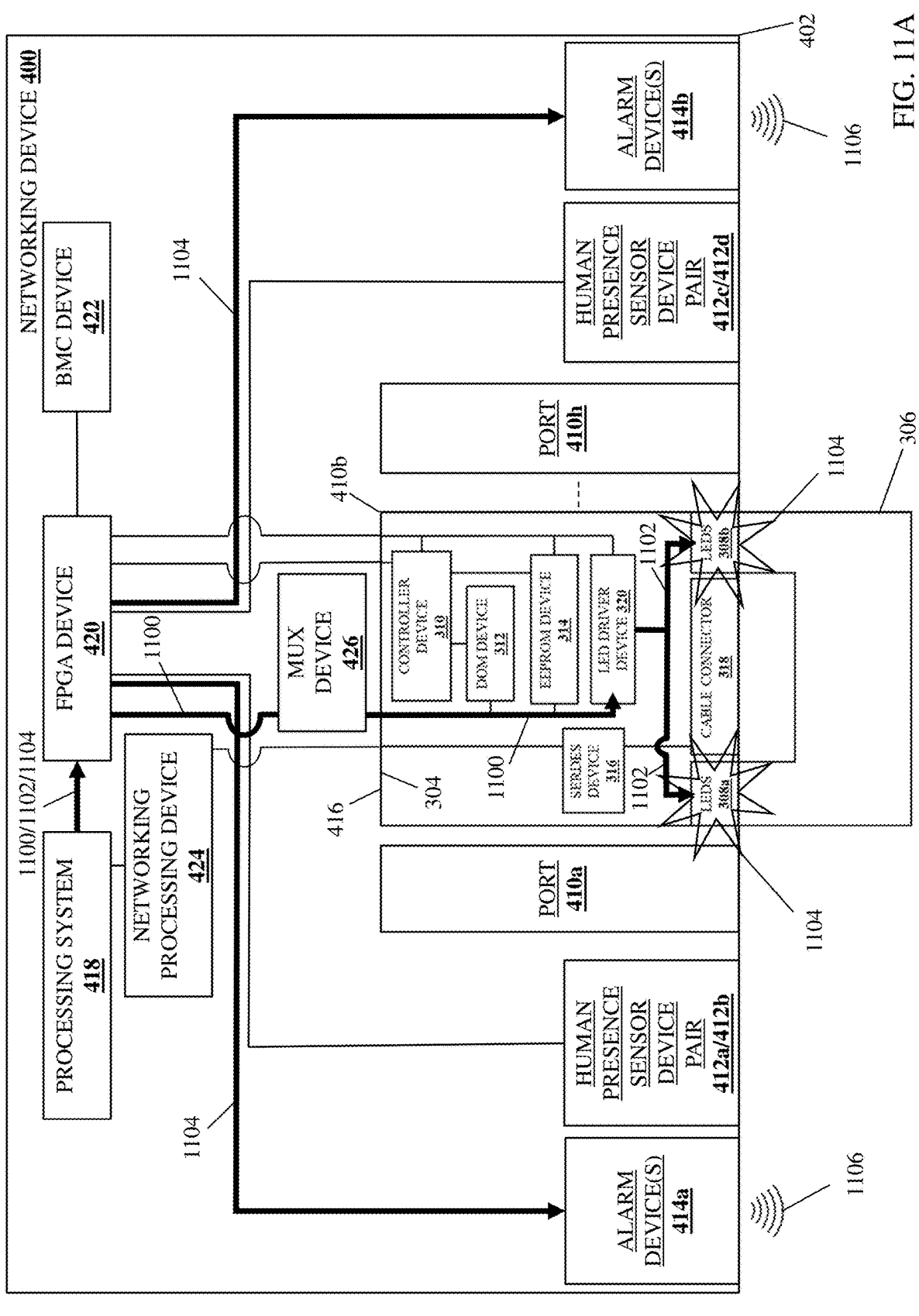
FIG. 11A is a schematic view illustrating an embodiment of the transceiver device and the networking device of FIG. 6 operating during the method of FIG. 5.

With reference to FIG. 11A, in an embodiment of block 512 and in response to identifying the human presence adjacent the networking device 400, the NOS provided by the processing system 418 may perform visual temperature indicator subsystem activation operations 1100 that may include controlling the LED Driver device 320 via the FPGA device 420 and the multiplexer 426 to cause the LED driver device 320 to perform LED activation operations 1102 that may include activating the LEDS 308a and 308b to cause the LEDS 308a and 308b to illuminate (as indicated by elements 1104 in FIG. 11A). In a specific example, at block 512 the NOS may disable a Low Power Mode (LPMode) of the transceiver device 300 in order to drive the LEDs 308a and 308b via the LED driver device 320, although other techniques for activating the visual temperature indicator subsystem of the present disclosure will fall within its scope as well.

As discussed above, the light emitted by the LEDs 308a and 308b may be transmitted by the transceiver device handle 306 and spread across the outer surface of the transceiver device handle 306 in a substantially uniform manner due to the materials that are used to provide the transceiver device handle 306 being configured to diffuse light, which will cause the outer surface of the transceiver device handle 306 to illuminate. Furthermore, in some embodiments, the LED driver device 320 may be configured to "blink" the light emitted by the LEDs 308a and 308b. In a specific example, the NOS may be configured to adjust a "blink rate" of the light emitted by the LEDs 308a and 308b based on the distance of the human detected adjacent the networking device 400 and reported by the human presence sensor device(s) 412a, 412b, 412c and/or 412d.

Figure 11B:
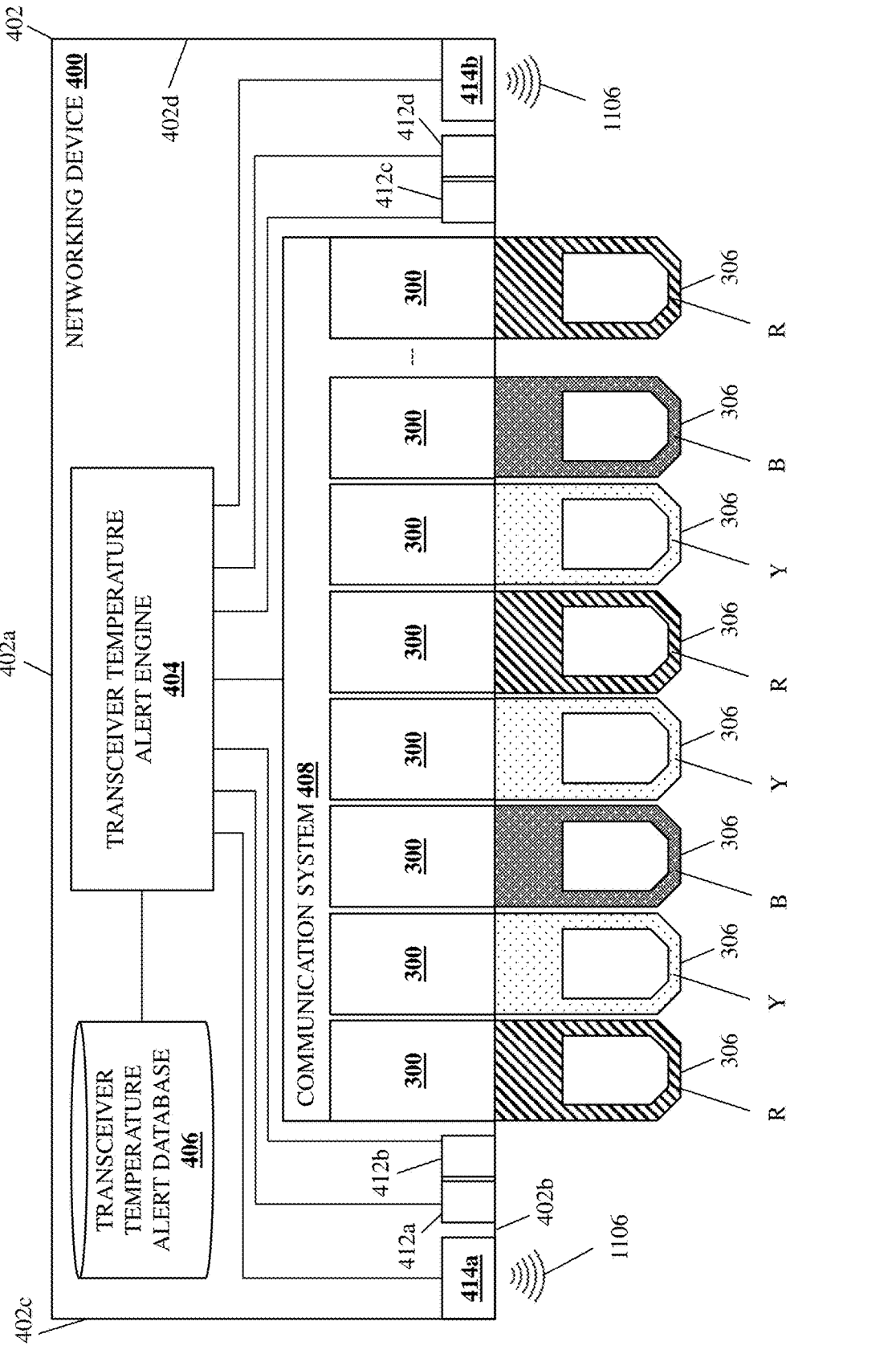
FIG. 11B is a schematic view illustrating an embodiment of the transceiver devices of FIGS. 2 and 3 connected to the networking device of FIG. 4A and operating during the method of FIG. 5.

As discussed above, a plurality of different temperature thresholds (e.g., temperatures between 35 and 45 degrees Celsius, temperatures between 45-55 degrees Celsius, and temperatures over 55 degrees Celsius) may be defined for the transceiver device 300 to provide for different activations of the visual temperature indications of the present disclosure. For example, with reference to FIG. 11B, at block 512 the NOS provided by the processing system 418 may activate the visual temperature indicator subsystems on different transceiver devices to cause them to emit light having different colors based on the different temperature thresholds exceeded by those transceiver devices. In the specific example illustrated in FIG. 11B, transceiver devices 300 with a relatively "cool" temperature between 35 and 45 degrees Celsius may be caused to emit light having a Blue color (indicated by element B in FIG. 11B), transceiver devices 300 with a relatively "intermediate" temperature between 45 and 55 degrees Celsius may be caused to emit light having a Yellow color (indicated by element Y in FIG. 11B), and transceiver devices 300 with a relatively "hot" temperatures over 55 degrees Celsius may be caused to emit light having a Red color (indicated by element R in FIG. 11B). However, while a specific example of visual temperature indications has been provided, one of skill in the art in possession of the present disclosure will appreciate how a variety of visual temperature indications will fall within the scope of the present disclosure as well. For example, the relatively "cool" temperature indication for transceiver devices discussed above may be provided for any temperatures below 45 degrees Celsius.

The method 500 may then proceed to optional block 514 where the computing device may activate alarm devices on the computing device. With reference back to FIGS. 11A and 11B, in an embodiment of optional block 514 and in response to identifying the human presence adjacent the networking device 400, the NOS provided by the processing system 418 may perform alarm device activation operations 1104 that may include activating the alarm device(s) 414a and/or 414b via the FPGA device 420. In the example provided in FIG. 11A, the alarm device activation operations 1104 by the NOS may include activating the alarm device(s) 414a and/or 414b to cause them to provide an audible noise (as indicated by elements 1106). In a specific example, the alarm devices 414a and 414b may be provided by piezo buzzers that may be activated in an "ON/OFF" pattern, with the time the piezo buzzers are "ON" being based on the distance of the human detected adjacent the networking device 400 and reported by the human presence sensor device(s) 412a, 412b, 412c, and/or 412d. However, as discussed above, in some embodiments the alarm devices 414a and 414b may be omitted and thus optional block 514 may be skipped. As such, a human adjacent the networking device 400 may be visually and audibly alerted to the temperature of transceiver devices 300 operating with the networking device 400, and thus may avoid coming into contact with those transceiver devices if they are indicated as having a relatively "high" temperature.

The method 500 then proceeds to decision block 516 where the method 500 proceeds depending on whether the transceiver device exceeds the temperature threshold. As discussed above, the transceiver device temperature monitoring at block 504 may occur periodically and/or throughout the method 500, and thus at decision block 516 the NOS provided by the processing system 418 may determine whether a current temperature identified for the transceiver device 300 as described above at block 504 exceeds the temperature threshold similarly as described above at decision block 506.

If, at decision block 516, the transceiver device exceeds the temperature threshold, the method 500 proceeds to decision block 518 where the method 500 proceeds depending on whether a human is detected adjacent the computing device. As will be appreciated by one of skill in the art in possession of the present disclosure, decision block 518 may be performed similarly as discussed above for decision block 510, as the human presence sensor device pairs 414a/414b and 414c/414d will remain activated as long as the transceiver device 300 exceeds the temperature threshold and will continue to monitor for the presence of a human adjacent the networking device 400.

If, at decision block 518, a human is detected adjacent the computing device, the method 500 returns to block 512. As such, the method 500 may loop such that the visual temperature indicator subsystem in the transceiver device remains activated (and the alarm devices on the computing device remain activated when optional block 514 is performed) as long as the transceiver device exceeds the temperature threshold and a human is detected adjacent the computing device.

Figure 12:
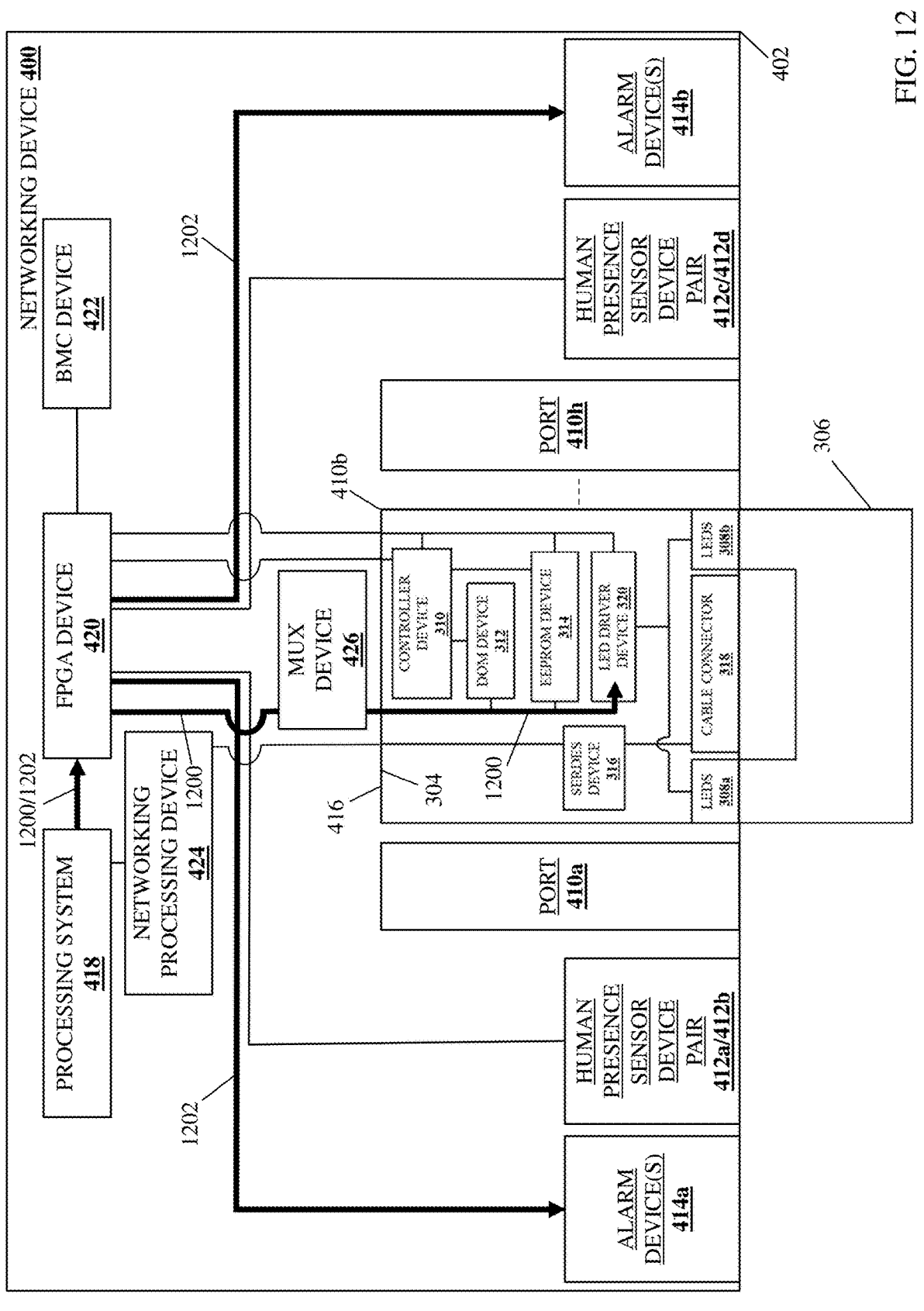
FIG. 12 is a schematic view illustrating an embodiment of the transceiver device and the networking device of FIG. 6 operating during the method of FIG. 5.

If, at decision block 516 the transceiver device does not exceed the temperature threshold, or if at decision block 518 a human is not detected adjacent the computing device, the method 500 proceeds to block 520 where the computing device deactivates the visual temperature indicator subsystem in the transceiver device. With reference to FIG. 12, in an embodiment of block 520 and in response to determining at decision block 516 that the transceiver device does not exceed a temperature threshold, or in response to determining at decision block 518 that a human is not detected adjacent the computing device, the NOS provided by the processing system 418 may perform visual temperature indicator subsystem deactivation operations 1200 that may include controlling the LED driver device 320 via the FPGA device 420 and the multiplexer device 426 to cause the LED driver device 320 to deactivate the LEDS 308a and 308b such that they cease emitting light. In a specific example, the visual temperature indicator subsystem deactivation operations 1200 may include the NOS enabling an LPMode in the transceiver device 300.

While not illustrated or described in detail, one of skill in the art in possession of the present disclosure will appreciate how a determination that the transceiver device 300 does not exceed the temperature threshold at decision block 516 may cause the NOS to deactivate the human presence sensor device pairs 412a/412b and 412c/412d. As such, the human presence sensor devices 412a, 412b, 412c, and 412d may be activated in response to a transceiver device 300 exceeding a temperature threshold, and will them remain activated to continue to detect for the presence of a human adjacent the networking device 400 until no transceiver devices exceed a temperature threshold, at which time they will be deactivated.

The method 500 may then proceed to optional block 522 where the computing device may deactivate the alarm devices on the computing device. With continued reference to FIG. 12, in an embodiment of optional block 522, the NOS provided by the processing system 418 may perform alarm device deactivation operations 1202 that may include deactivating the alarm device(s) 414a and 414b to stop them from producing the audible noise discussed above.

The method 500 then returns to block 504. As such, the method 500 may loop such that the visual temperature activation subsystem in the transceiver device may be activated when the temperature of the transceiver device exceeds the temperature threshold and a human is detected adjacent the computing device, and may be deactivated when either the temperature of the transceiver device drops below the temperature threshold or a human is not detected adjacent the computing device.

Thus, systems and methods have been described that provide visual indications about the temperature of transceiver device operating with a computing device. For example, the transceiver temperature alert system of the present disclosure may include a transceiver device that includes a transceiver device chassis. A computing device connector is included on the transceiver device chassis and is configured to connect to a computing device. A visual temperature indicator subsystem is included on the transceiver device chassis. A visual temperature indicator activation subsystem is housed in the transceiver device chassis, and is coupled to the computing device connector and the visual temperature indicator subsystem. The visual temperature indicator activation subsystem may receive a visual temperature indicator activation command from the computing device and, in response, activate the visual temperature indicator subsystem included on the transceiver device to produce a visual indication of a temperature of the transceiver device. As such, users may be alerted to the temperature of transceiver devices without being required to perform the cumbersome conventional transceiver temperature retrieval operations discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A transceiver device, comprising:
a transceiver device chassis;
a computing device connector that is included on the transceiver device chassis and that is configured to connect to a computing device;
a visual temperature indicator subsystem that is included on the transceiver device chassis;
a visual temperature indicator activation subsystem that is housed in the transceiver device chassis, that is coupled to the computing device connector and the visual temperature indicator subsystem, and that is configured to:
receive, when the computing device connector is connected to a computing device, a visual temperature indicator activation command from the computing device; and
activate, in response to receiving the visual temperature indicator activation command, the visual temperature indicator subsystem to produce a visual indication of a temperature of the transceiver device; and
a memory device that is included in the transceiver device chassis, that is coupled to the computing device connector, that is accessible to the computing device when the computing device connector is connected to the computing device, and that stores visual temperature indicator activation subsystem information identifying the visual temperature indicator activation subsystem, and visual temperature indicator subsystem information identifying the visual temperature indicator subsystem.

2. The transceiver device of claim 1, wherein the visual temperature indicator subsystem includes at least one Light Emitting Diode (LED) device that is configured to emit light to produce the visual indication of the temperature of the transceiver device.

3. The transceiver device of claim 2, further comprising:
   a transceiver device handle that is included on the transceiver device chassis and that is configured to:
      diffuse the light emitted by the at least one LED device.

4. The transceiver device of claim 2, wherein the at least one LED device is configured to:
   emit a first color light to produce the visual indication of a first temperature of the transceiver device; and
   emit a second color light that is different than the first color light to produce the visual indication of a second temperature of the transceiver device that is different than the first temperature.

5. The transceiver device of claim 1, wherein the transceiver device is a Quad Small Form-factor Pluggable Double-Density (QSFP-DD) optical transceiver device.

6. The transceiver device of claim 1, wherein the computing device connector is a switch device connector that is configured to connect to a switch device.

7. A transceiver thermal alert system, comprising:
   a transceiver device;
   a visual temperature indicator subsystem that is included on the transceiver device;
   a computing device that includes a port that is connected to the transceiver device; and
   at least one proximity sensor device that is included on the computing device, wherein the computing device is configured to:
      retrieve a temperature of the transceiver device;
      determine that the at least one proximity sensor device has detected a human adjacent the computing device, and in response:
         generate, based on the temperature of the transceiver device, a visual temperature indicator activation command; and
         transmit the visual temperature indicator activation command to the transceiver device to cause the visual temperature indicator subsystem to produce a visual indication of a temperature of the transceiver device.

8. The transceiver thermal alert system of claim 7, wherein the visual temperature indicator subsystem includes at least one Light Emitting Diode (LED) device that is configured to emit light to produce the visual indication of the temperature of the transceiver device.

9. The transceiver thermal alert system of claim 8, further comprising:
   a transceiver device handle that is included on the transceiver device and that diffuses the light emitted by the at least one LED device.

10. The transceiver thermal alert system of claim 8, wherein the computing device is configured to:
   retrieve a first temperature of the transceiver device;
   generate, based on the first temperature of the transceiver device, a first visual temperature indicator activation command;
   transmit the first visual temperature indicator activation command to the transceiver device to cause the at least one LED device to emit a first color light to produce the visual indication of the first temperature of the transceiver device;
   retrieve a second temperature of the transceiver device;
   generate, based on the second temperature of the transceiver device, a second visual temperature indicator activation command;

transmit the second visual temperature indicator activation command to the transceiver device to cause the at least one LED device to emit a second color light that is different than the first color light to produce the visual indication of the second temperature of the transceiver device that is different than the first temperature.

11. The transceiver thermal alert system of claim 7, wherein the computing device is configured to:
   access a memory device that is included in the transceiver device;
   retrieve visual temperature indicator activation subsystem information identifying the visual temperature indicator activation subsystem from the memory device;
   retrieve visual temperature indicator subsystem information identifying the visual temperature indicator subsystem from the memory device; and
   use the visual temperature indicator activation subsystem information and the visual temperature indicator subsystem information to generate the visual temperature indicator activation command.

12. The transceiver thermal alert system of claim 7, wherein the computing device is a switch device.

13. The transceiver thermal alert system of claim 7, wherein the transceiver device is a Quad Small Form-factor Pluggable Double-Density (QSFP-DD) optical transceiver device.

14. A method for providing alerts related to a temperature of a transceiver device, comprising:
   storing, by a memory device that is included in a transceiver device, visual temperature indicator activation subsystem information identifying a visual temperature indicator activation subsystem included in the transceiver device, and visual temperature indicator subsystem information identifying a visual temperature indicator subsystem included in the transceiver device;
   connecting, by a computing device connector that is included on the transceiver device and coupled to the memory device, to a computing device,
   receiving, by the visual temperature indicator activation subsystem that is included in the transceiver device via the computing device connector, a visual temperature indicator activation command from the computing device; and
   activating, by the visual temperature indicator activation subsystem based on the visual temperature indicator activation command, the visual temperature indicator subsystem that is included in the transceiver device to produce a visual indication of a temperature of the transceiver device.

15. The method of claim 14, further comprising:
   emitting, by at least one Light Emitting Diode (LED) device included in the visual temperature indicator subsystem, light to produce the visual indication of the temperature of the transceiver device.

16. The method of claim 15, further comprising:
   diffusing, by a transceiver device handle that is included on the transceiver device, the light emitted by the at least one LED device.

17. The method of claim 15, further comprising:
   emitting, by the at least one LED, a first color light to produce the visual indication of a first temperature of the transceiver device; and
   emitting, by the at least one LED, a second color light that is different than the first color light to produce the visual indication of a second temperature of the transceiver device that is different than the first temperature.

18. The method of claim 14, wherein the transceiver device is a Quad Small Form-factor Pluggable Double-Density (QSFP-DD) optical transceiver device.

19. The method of claim 14, wherein the computing device connector is a switch device connector that is configured to connect to a switch device.

20. The method of claim 14, further comprising:

determining, by the computing device, that at least one proximity sensor device that is included on the computing device has detected a human adjacent the computing device; and transmitting, by the computing device in response to determining that the at least one proximity sensor device has detected the human adjacent the computing device, the visual temperature indicator activation command to the visual temperature indicator activation subsystem to cause the visual temperature indicator activation subsystem to activate the visual temperature indicator subsystem to produce the visual indication of the temperature of the transceiver device.

\* \* \* \* \*